United States Patent
Choo

(10) Patent No.: US 10,603,638 B2
(45) Date of Patent: Mar. 31, 2020

(54) METHOD FOR MANUFACTURING ELECTRICALLY CONDUCTIVE SEPARATION MEMBRANE FOR WATER TREATMENT, SEPARATION MEMBRANE MANUFACTURED THEREBY, AND WATER TREATMENT METHOD USING SAME SEPARATION MEMBRANE

(71) Applicant: KYUNGPOOK NATIONAL UNIVERSITY INDUSTRY-ACADEMIC COOPERATION, Daegu (KR)

(72) Inventor: Kwang Ho Choo, Daegu (KR)

(73) Assignee: KYUNGPOOK NATIONAL UNIVERSITY INDUSTRY-ACADEMIC COOPERATION FOUNDATION, Daegu (KR)

( * ) Notice: Subject to any disclaimer, the term of this patent is extended or adjusted under 35 U.S.C. 154(b) by 1202 days.

(21) Appl. No.: 14/784,994

(22) PCT Filed: Apr. 16, 2014

(86) PCT No.: PCT/KR2014/003322
§ 371 (c)(1),
(2) Date: Jan. 21, 2016

(87) PCT Pub. No.: WO2014/171745
PCT Pub. Date: Oct. 23, 2014

(65) Prior Publication Data
US 2016/0199786 A1    Jul. 14, 2016

(30) Foreign Application Priority Data
Apr. 16, 2013 (KR) .................. 10-2013-0041855

(51) Int. Cl.
C02F 1/46 (2006.01)
B01D 71/02 (2006.01)
(Continued)

(52) U.S. Cl.
CPC .......... B01D 71/024 (2013.01); B01D 65/08 (2013.01); B01D 67/0041 (2013.01);
(Continued)

(58) Field of Classification Search
CPC ....... C02F 1/46114; C02F 2001/48181; B01D 67/0041; B22F 2201/10
See application file for complete search history.

(56) References Cited

U.S. PATENT DOCUMENTS

| 3,096,272 A * | 7/1963 | Beer .................. C23C 8/10 148/255 |
| 2008/0038139 A1* | 2/2008 | Onishi .............. B01D 39/2034 419/2 |
| 2013/0305673 A1* | 11/2013 | Zeller ................ B01D 39/2034 55/523 |

FOREIGN PATENT DOCUMENTS

| JP | 05-287328 A1 | 11/1993 |
| KR | 10-0562043 B1 | 3/2006 |

(Continued)

*Primary Examiner* — Arun S Phasge
(74) *Attorney, Agent, or Firm* — McNees Wallace & Nurick LLC

(57) ABSTRACT

The present invention relates to a method for manufacturing separation membrane for water treatment, separation membrane manufactured thereby, and a water treatment method using the separation membrane. More specifically, the present invention relates to: a method for manufacturing separation membrane for water treatment, made of electrically conductive metal or non-metal materials, which can enhance the membrane performance by reducing membrane contamination during water treatment and replace separation membrane made of polymer materials; separation membrane
(Continued)

manufactured thereby; and a water treatment method using the separation membrane.

19 Claims, 6 Drawing Sheets

(51) Int. Cl.
- *B22F 3/22* (2006.01)
- *B01D 69/02* (2006.01)
- *C02F 1/461* (2006.01)
- *B01D 65/08* (2006.01)
- *B01D 69/14* (2006.01)
- *B01D 67/00* (2006.01)
- *B32B 37/24* (2006.01)
- *C02F 1/44* (2006.01)
- *B22F 5/00* (2006.01)

(52) U.S. Cl.
CPC ........... *B01D 69/02* (2013.01); *B01D 69/141* (2013.01); *B22F 3/225* (2013.01); *B32B 37/24* (2013.01); *C02F 1/46114* (2013.01); *B01D 2321/22* (2013.01); *B01D 2325/10* (2013.01); *B01D 2325/26* (2013.01); *B22F 5/006* (2013.01); *B22F 2998/10* (2013.01); *B22F 2999/00* (2013.01); *B32B 2264/102* (2013.01); *B32B 2307/202* (2013.01); *B32B 2307/726* (2013.01); *B32B 2311/30* (2013.01); *C02F 1/44* (2013.01); *C02F 2001/46133* (2013.01); *C02F 2001/46161* (2013.01)

(56) References Cited

FOREIGN PATENT DOCUMENTS

| | | |
|---|---|---|
| KR | 10-2008-0093776 A1 | 10/2008 |
| KR | 10-2012-0002189 A1 | 1/2012 |
| KR | 10-2012-0117106 A1 | 10/2012 |
| KR | 10-2013-0041855 | 8/2015 |

\* cited by examiner

【FIG. 1】
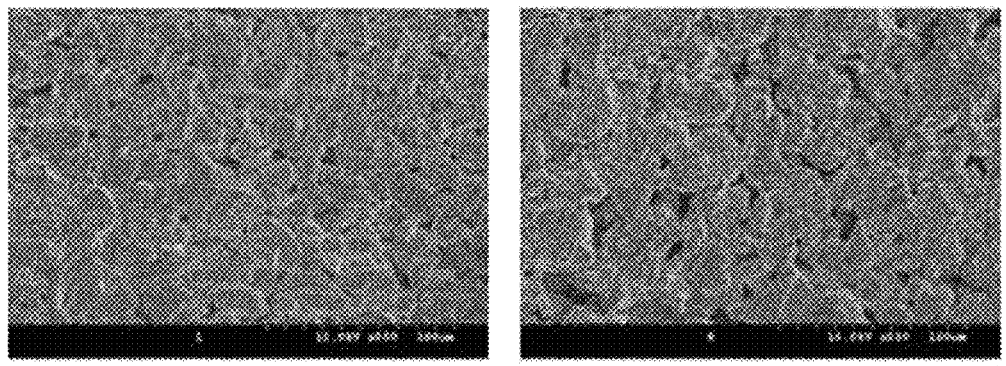
【FIG. 2】
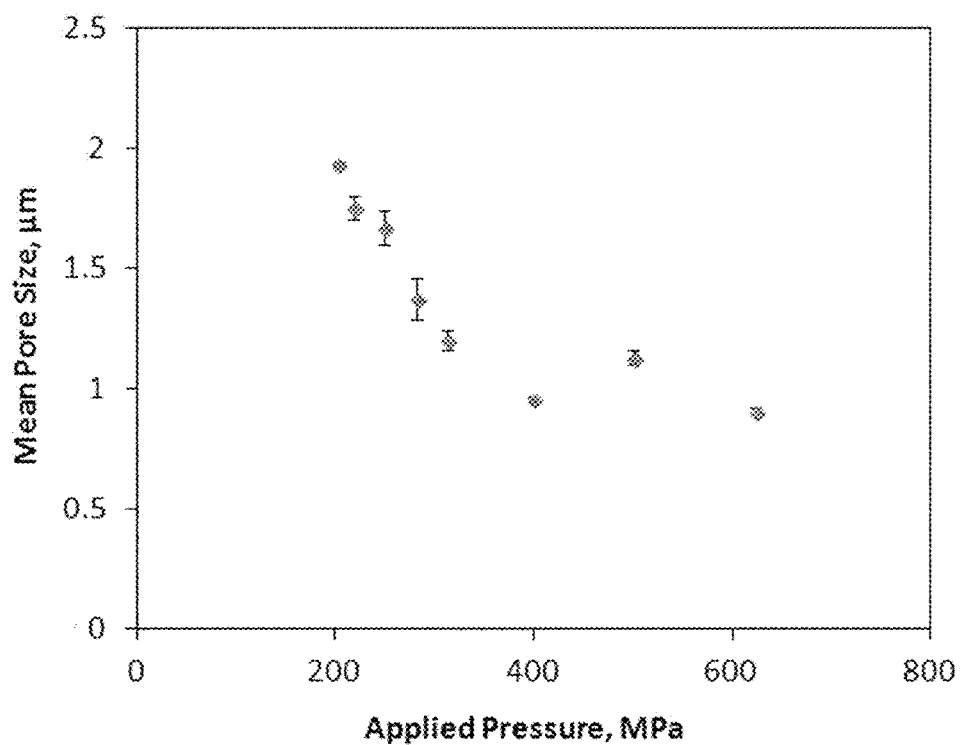

【FIG. 3】
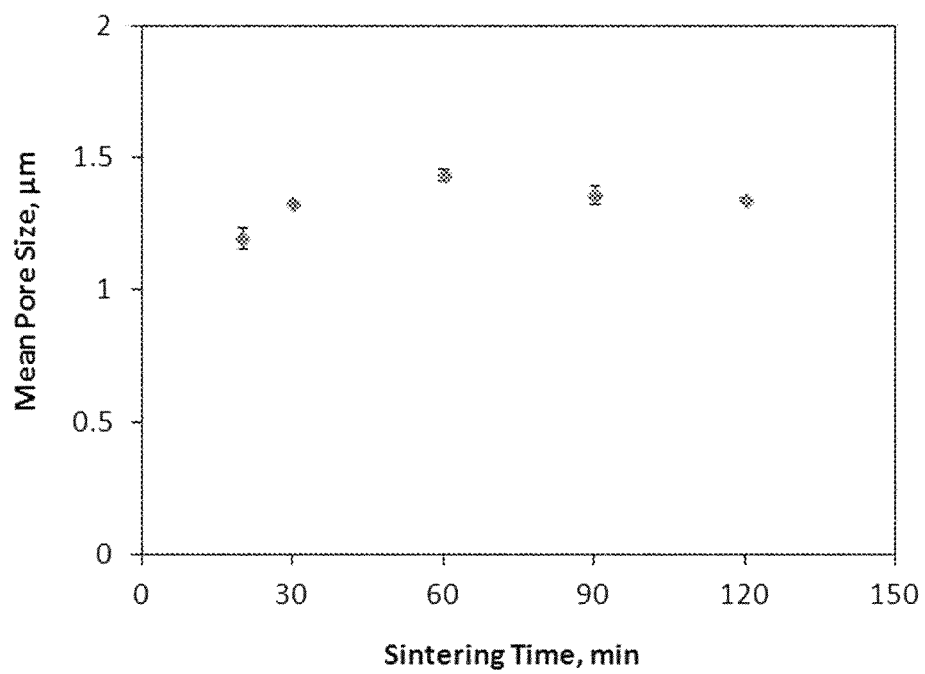
【FIG. 4】
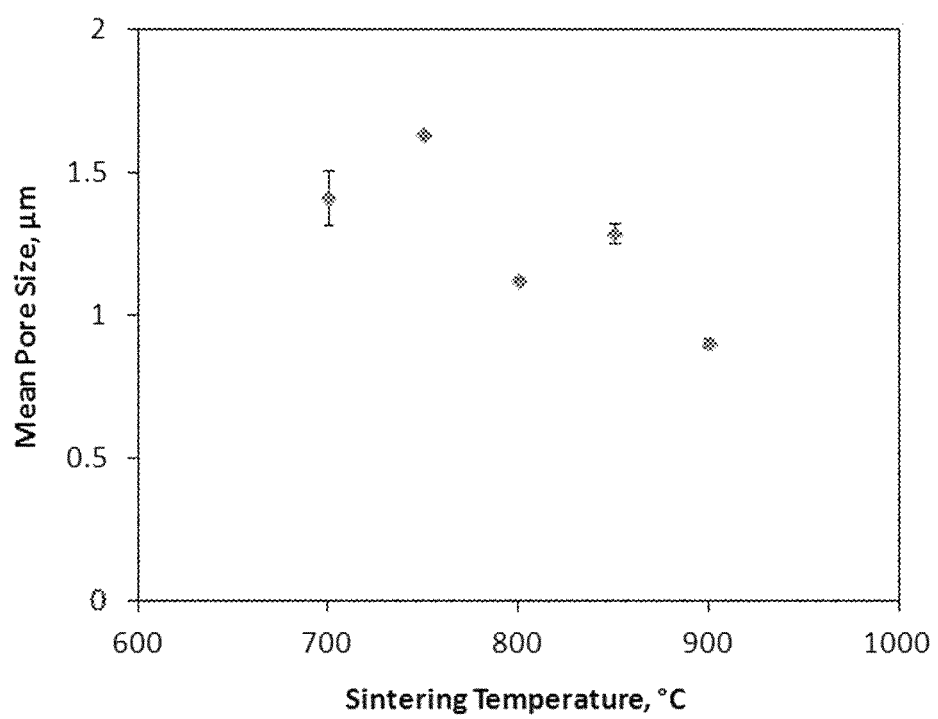

[FIG. 5]
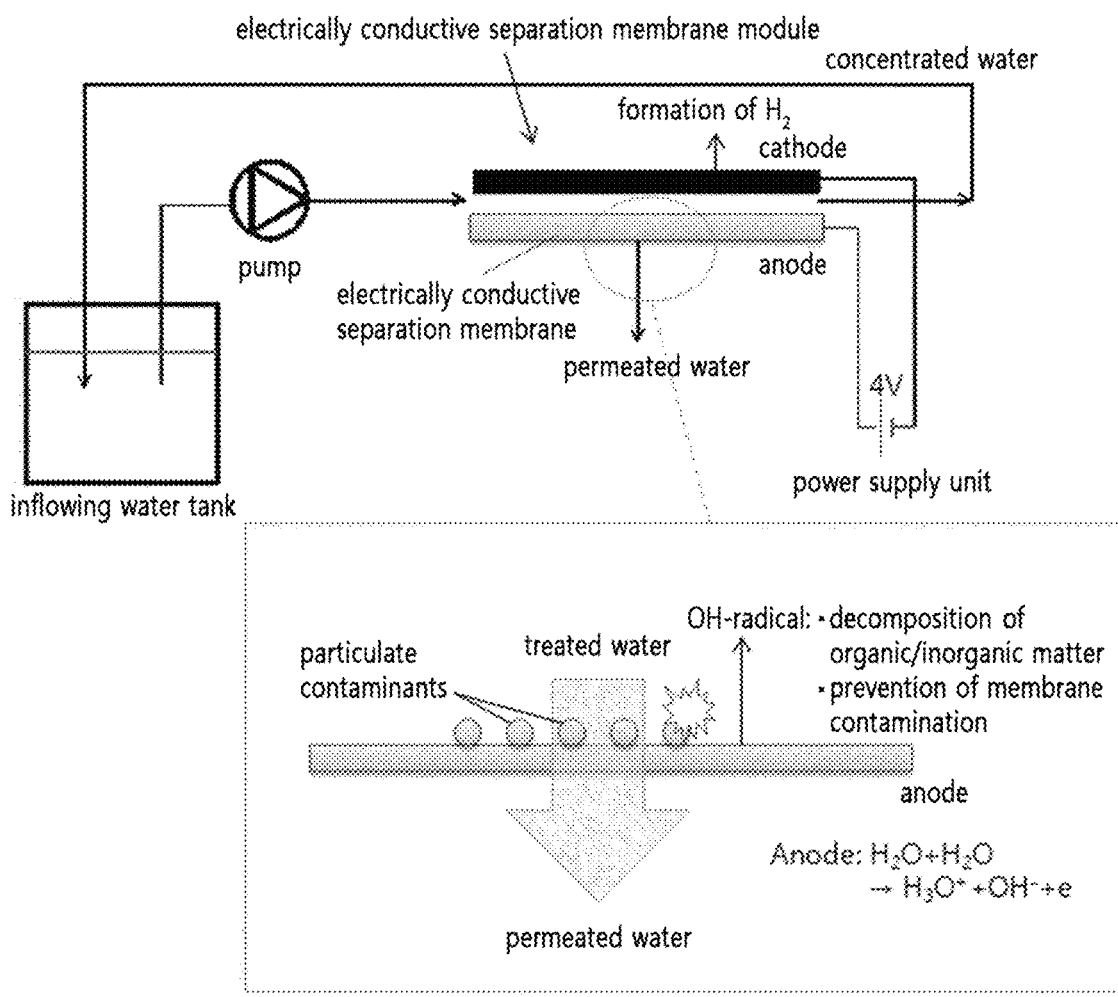

[FIG. 6]
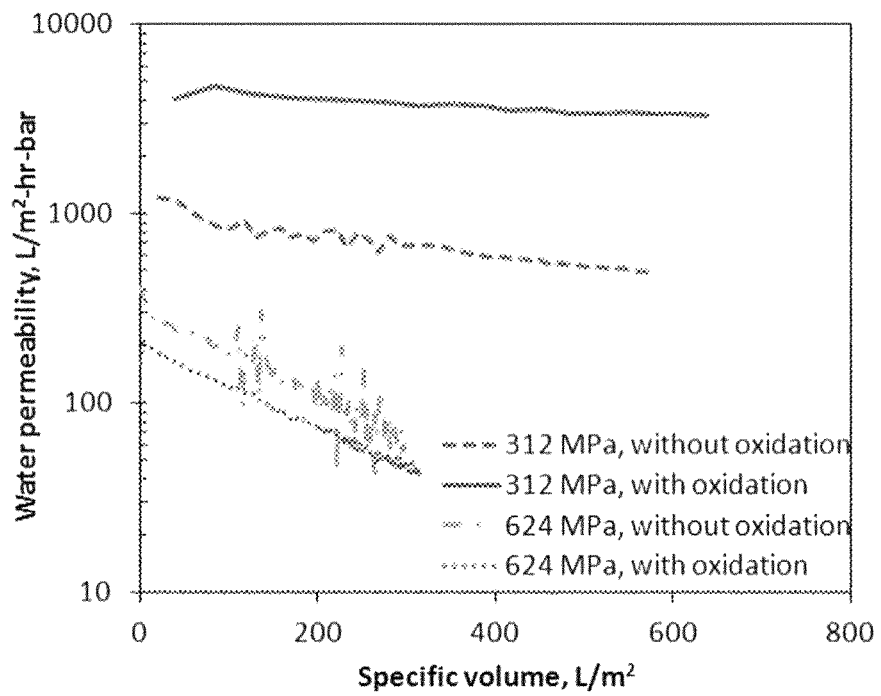
[FIG. 7]
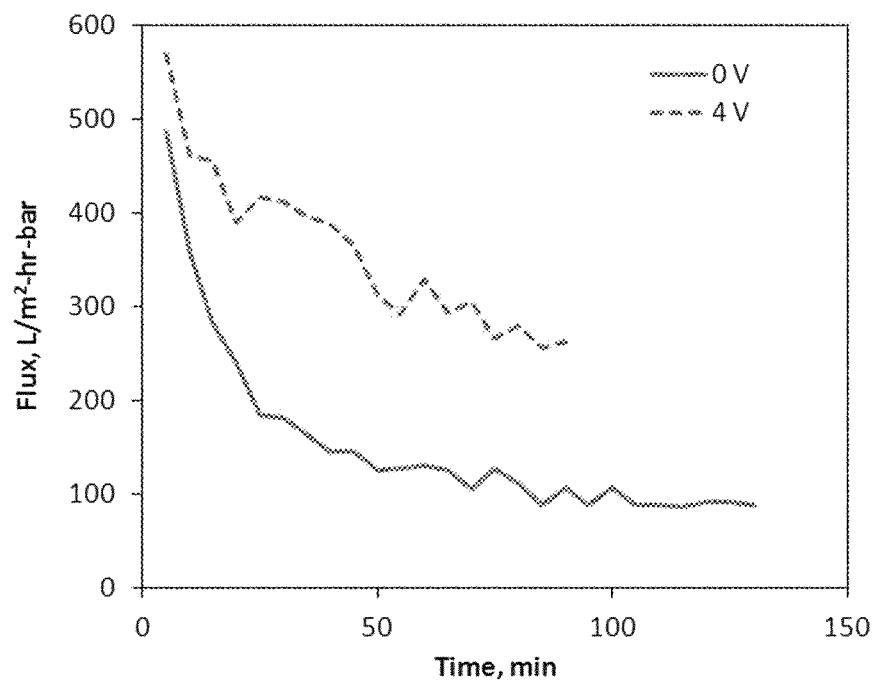

[FIG. 8]
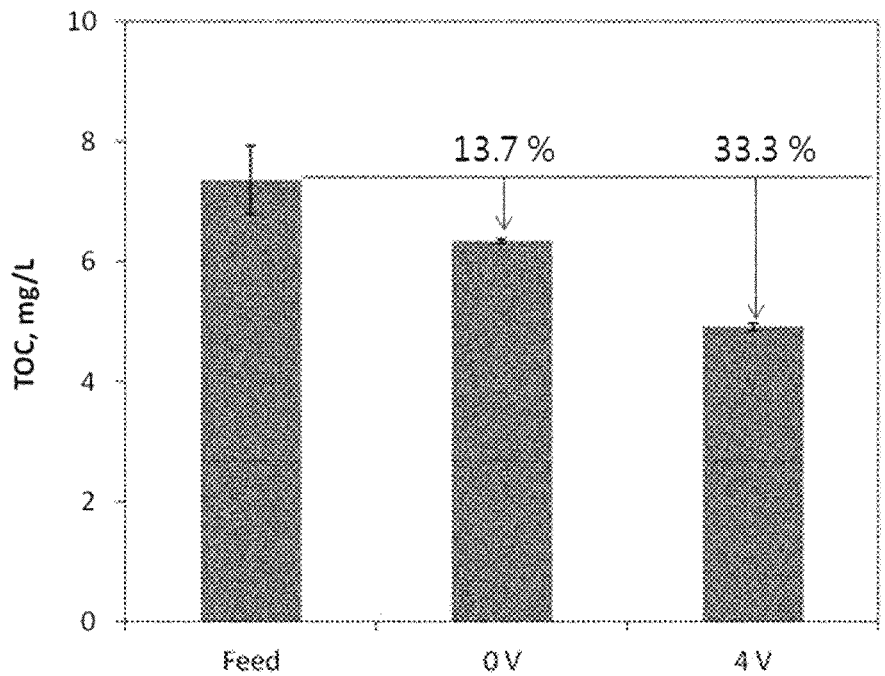
[FIG. 9]
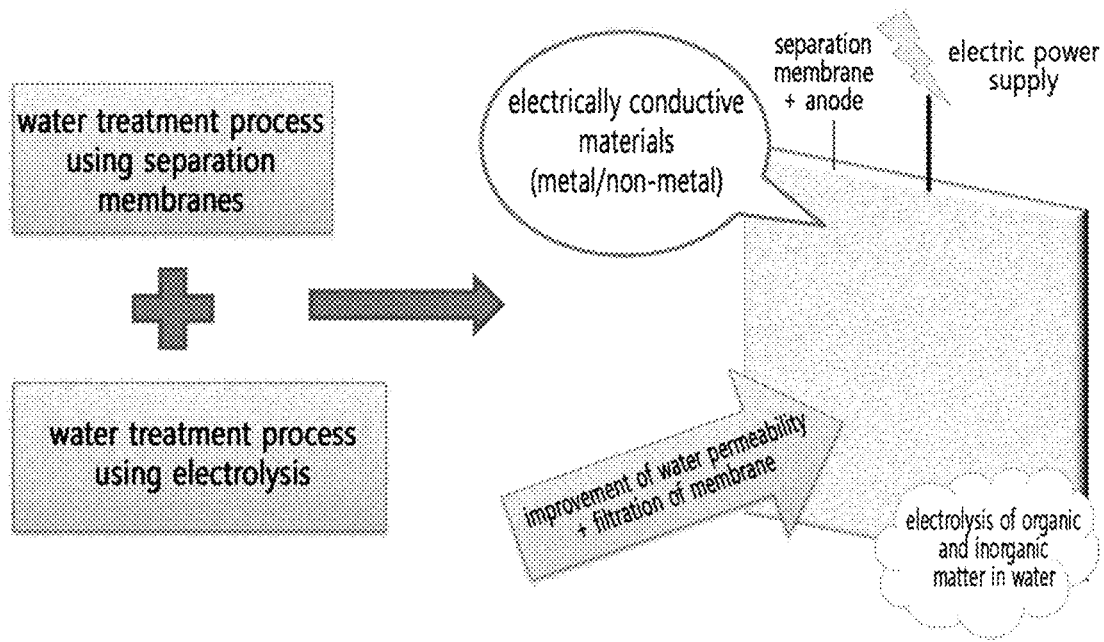

[FIG. 10]
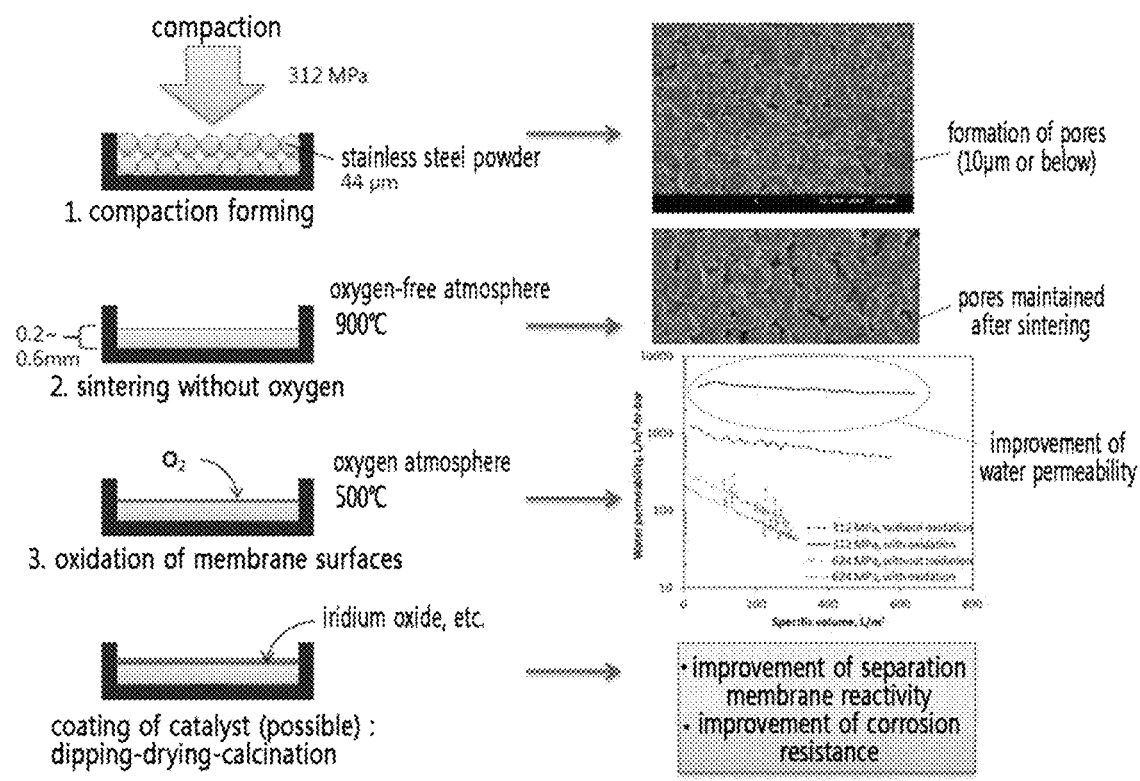

METHOD FOR MANUFACTURING ELECTRICALLY CONDUCTIVE SEPARATION MEMBRANE FOR WATER TREATMENT, SEPARATION MEMBRANE MANUFACTURED THEREBY, AND WATER TREATMENT METHOD USING SAME SEPARATION MEMBRANE

TECHNICAL FIELD

The present invention relates to a method for manufacturing separation membrane for water treatment, separation membrane manufactured thereby, and a water treatment method using the separation membrane. More specifically, the present invention relates to: a method for manufacturing separation membrane for water treatment, made of electrically conductive metallic or non-metallic materials, which can enhance the membrane performance by reducing membrane fouling during water treatment and replace the separation membranes made of polymer materials; separation membrane manufactured thereby; and a water treatment method using the separation membrane.

BACKGROUND ART

Recently, a membrane-based water treatment process has been recognized as an extensively used process, because it ensures reliable water quality, reduces land area required, offers easy operations and automation of operations, etc. Despite such advantages, the biggest problem rising from the membrane-based water treatment process is reduced membrane permeability due to membrane fouling, which subsequently increases operational costs. As a result, various alternative ways for preventing membrane contamination such as periodic backwashing, chemical washing, etc. have been proposed. Although a wide variety of separation membranes, mostly made of polymers, with improved chemical resistance and pollution resistance have traditionally been used, a full recovery still cannot be expected even through recovery washing after the occurrence of fouling.

Electrolysis is a technique that electrochemically oxidizes or reduces contaminants in water by applying electric energy to waste water containing inorganic or organic contaminants from outside. Also, colloidal materials, which are negatively charged, are electrically neutralized during electrolysis, leading to coagulation reaction of the materials. OH radicals are formed from the anode, and these radicals play a role in oxidizing organic matter in water, whereas the cathode may accept electrons, which may form hydrogen by reduction of proton.

Meanwhile, a powder metallurgy process is advantageous in that powdered raw materials are made into a desired shape, which are then subject to sintering heat treatment at a temperature equal to or below the melting point thereof to obtain products, thereby enabling processing of metal materials with high melting points, and manufacturing porous materials or composite materials. Also, the process is known to be cost effective compared to other metallurgy processes with regard to mass production. The pores and porosity of materials may be controlled depending on applied pressure, pressing time, sintering temperature and conditions, and the like.

Under these circumstances, the present inventors have made efforts to manufacture separation membrane made of new materials which can enhance the membrane performance by reducing membrane fouling during water treatment and replace the separation membranes made of polymer materials, and as a result, powders, made of metal or non-metal, which shows electrical conductivity were compressed to form a shape, and were subsequently sintered under an oxygen-free condition to manufacture separation membrane for water treatment which can improve water permeability and removal efficiency of organic matter while applying electricity during water treatment, thereby completing the present invention.

DISCLOSURE

Technical Problem

One objective of the present invention is to provide a method for manufacturing separation membrane for water treatment, made of electrically conductive metallic or non-metallic materials which can enhance the membrane performance by reducing membrane fouling during water treatment and replace separation membrane made of polymers.

Another objective of the present invention is to provide separation membrane for water treatment manufactured by the method above.

Still another objective of the present invention is to provide a water treatment method using the separation membrane for water treatment.

Technical Solution

In order to achieve the objectives described above, the present invention provides a method for manufacturing separation membrane for water treatment comprising:
injecting electrically conductive metal or non-metal particles having a particle size of 10 μm to 200 μm into a mold and applying pressure to obtain a compacted body (step 1); and
sintering the compacted body under an oxygen-free condition to manufacture separation membrane for water treatment (step 2).

Preferably, the method for manufacturing the separation membrane for water treatment may further include sintering the separation membrane for water treatment under an oxygen condition to oxidize the surface of the separation membrane for water treatment (step 3) after step 2 above.

Preferably, the method for manufacturing the separation membrane for water treatment may further include coating the separation membrane for water treatment with at least one catalyst selected from the group consisting of iridium oxide, titanium oxide, and niobium oxide (step 4) after step 2 or step 3 above.

Preferably, the method for manufacturing the separation membrane for water treatment may further include cooling the sintered separation membrane for water treatment to room temperature (step 2-1) after step 2 or step 3 above or therebetween.

The step 1 above is a step of injecting electrically conductive metal or non-metal particles having a particle size of 10 μm to 200 μm into a mold and applying pressure to obtain a compacted body, wherein a predetermined amount of particles, metal powders, is injected into the mold to maintain a certain shape, and high pressure is applied to manufacture the compacted body.

As used herein, the term "electrically conductive metal or non-metal particles" refers to a metal or non-metal in the form of particles that exhibits electrical conductivity.

In the present invention, metal or non-metal species having electrical conductivity may be used as described above, to be used as an electrode in a water system, and metal or non-metal species having a particle shape of predetermined size may be used for a powder metallurgy process. Also, metal oxides having electrical conductivity may be used for corrosion resistance. Specifically, the electrically conductive metal or non-metal may be at least one selected from the group consisting of stainless steel, titanium, aluminum, iron, and carbon nanotubes, but is not limited thereto.

In the present invention, the electrically conductive metal or non-metal particles having a particle size of 10 μm to 200 μm may be used. As described above, the particle size is adjusted to control the pore size and porosity.

In the present invention, the injection amount of the electrically conductive metal or non-metal particles determines the thickness of the separation membrane, and preferably, the particles are injected to have a thickness of 0.2 mm to 0.6 mm after compaction.

As used herein, the term "mold" refers to a template for filling and pressing the electrically conductive metal or non-metal particles in order to form separation membrane for water treatment.

As used herein, the term "compacted body" refers to molded articles obtained by compaction.

In the present invention, a pressure, a factor to maintain the shape of compacted body and control the pore size of separation membrane, of 300 MPa or more is required, preferably, the pressure may be from 200 MPa to 800 MPa, more preferably, the pressure may be from 300 MPa to 650 MPa, and most preferably, the pressure may be 500 MPa. Also, the compaction time may vary depending on the applied pressure and the type of metal particles used, and generally, the compaction time may be from 3 minutes to 30 minutes, considering the applied pressure and type of metal particles used in the present invention. In an embodiment, a pressure of 500 MPa may be applied for 5 minutes.

In the present invention, the compacted body may preferably be a flat-plate type, considering that it is used as a separation membrane.

The step 2 above is a step of manufacturing separation membrane by sintering the compacted body under an oxygen-free condition, wherein the manufactured compacted body is sintered at a high temperature under a reducing atmosphere excluding oxygen to maintain a pure metal state and prevent oxidation of metals.

As used herein, the term "oxygen-free condition" refers to a gas atmosphere without oxygen. Preferably, in the present invention, the gas for the oxygen-free condition may be at least one selected from argon, nitrogen, and hydrogen. Such gases are used at a speed of 10 cc/min to 1000 cc/min. If the speed is below 10 cc/min, the air outside is partially introduced to induce oxidation, whereas when the speed exceeds 1000 cc/min, the economic feasibility decreases, as there is a significant increase in gas consumption. Therefore, the gases are preferably used within the range.

In the present invention, the sintering temperature of step 2 may be from 400° C. to 1400° C., and more preferably, from 800° C. to 900° C. If the sintering temperature is below 400° C., there is insufficient sintering which makes the physical properties weak, whereas if the sintering temperature exceeds 1400° C., the sintering may occur too much, or some portion of the metal powder may melt, which does not enable the formation of pores, or results in very low porosity.

In the present invention, the sintering duration of step 2 may be from 30 minutes to 120 minutes. The step 3 above is a step of sintering the separation membrane under an oxygen condition to oxidize the surface of the separation membrane for water treatment, wherein the surface of the separation membrane is oxidized by sintering the separation membrane under an oxygen condition in order to improve water permeability.

In the present invention, the sintering temperature of step 3 may be from 400° C. to 600° C. If the sintering temperature is below 400° C., hydrophilicity does not occur properly, whereas if the sintering temperature exceeds 600° C., the shape of the separation membrane may be distored.

In the present invention, the sintering duration of step 3 may be from 30 minutes to 120 minutes. The step 4 above is a step of coating separation membrane for water treatment with at least one catalyst selected from the group consisting of iridium oxide, titanium oxide, and niobium oxide, wherein the separation membrane for water treatment is coated with a catalyst in order to improve reactivity and corrosion resistance thereof.

In the present invention, the coating of the catalyst may be carried out via a dipping-drying-calcination.

The step 2-1 above is a step of cooling the sintered separation membrane to room temperature, wherein the separation membrane sintered at a high temperature is cooled.

In the present invention, in the case in which step 2-1 is carried out after step 2 or between step 2 and step 3, it is preferable to maintain the gas injection amount of step 2 to prevent oxidation during cooling. Also, in the cooling step, if the separation membrane is rapidly cooled, the shape thereof may undergo deformation. Thus, the cooling rate may preferably be from 10° C./min to 30° C./min.

Further, the present invention provides separation membrane for water treatment manufactured by the manufacturing method above.

In the present invention, the pore size of the separation membrane manufactured as described above may be from 0.05 μm to 10 μm.

In the present invention, the thickness of the separation membrane may be from 0.2 mm to 0.6 mm as described in the manufacturing method.

Furthermore, the present invention provides a water treatment method comprising:
a) bringing the separation membrane for water treatment manufactured by the manufacturing method of the present invention in contact with water targeted for water treatment (step a); and
b) filtering water while applying electricity to the separation membrane for water treatment having contact with water (step b).

The step a above is a step of bringing the separation membrane for water treatment manufactured by the manufacturing method of the present invention in contact with water targeted for water treatment, wherein the separation membrane for water treatment is brought into contact with water for water treatment.

In the present invention, the water targeted for water treatment may be of various kinds of waste water including domestic waste water, industrial water, agricultural waste water, etc., but is not limited thereto.

In the present invention, the separation membrane for water treatment may be used as an anode.

In the present invention, the electricity applied to the separation membrane for water treatment may be applied under conditions of 1 volt to 6 volts (V).

The water treatment method of the present invention uses the separation membrane for water treatment as an anode at which oxidation occurs to allow for permeation of water, thereby dramatically reducing membrane contamination formed on the surface and pores, and improving degradation of contaminants at the same time.

In the present invention, the reduction in membrane fouling may be confirmed through changes in membrane permeability according to treatment time. Such observation is seen in FIG. 7, wherein, when a voltage of 4 V is applied, the membrane permeability is highly maintained compared to using a voltage of 0 V, and therefore it is proved that the membrane fouling is reduced.

Advantageous Effect

The electrically conductive separation membrane for water treatment of the present invention exhibit excellent chemical stability compared to polymer membrane, and can be used as an electrode by applying external electricity. This can subsequently electrolyze organic or inorganic matter in water and eliminate particulates via the electrically conductive separation membrane, thereby improving efficiency for water treatment.

BRIEF DESCRIPTION OF DRAWINGS

FIG. 1 shows high-magnification photos of electrically conductive separation membrane for water treatment made of stainless steel according to one embodiment of the present invention. The left photo represents compacted separation membrane and the right photo represents sintered separation membrane, both with a magnification of 500×.

FIG. 2 shows changes in the mean pore size of separation membrane according to applied pressure. Herein, the compaction time was 1 minute, the sintering temperature was at 900° C., and the sintering duration was 20 minutes.

FIG. 3 shows changes in the mean pore size of separation membrane according to the sintering duration. Herein, the applied pressure was 300 MPa, the compaction time was 1 minute, and the sintering temperature was 900° C.

FIG. 4 shows changes in the mean pore size of separation membrane according to the sintering temperature. Herein, the applied pressure was 600 MPa, the compaction time was 1 minute, and the sintering duration was 20 minutes.

FIG. 5 shows a schematic diagram of a water treatment apparatus using the electrically conductive separation membrane.

FIG. 6 shows ultra-pure water permeability according to applied pressure, with or without subsequent oxidation.

FIG. 7 shows changes in membrane permeability of waste water according to changes in voltages.

FIG. 8 shows a removal rate of total organic carbons (TOC) of waste water according to changes in voltages.

FIG. 9 shows a schematic diagram demonstrating features of a technical constitution of electrically conductive separation membrane for water treatment of the present invention.

FIG. 10 shows a schematic diagram demonstrating technical features of a manufacturing process and its respective processes of the separation membrane for water treatment according to one embodiment of the present invention.

BEST MODE

Hereinafter, the present invention will be described in more detail with reference to the following examples, comparative examples, and experimental examples. However, the following examples, comparative examples, and experimental examples are provided for illustrative purposes only, and the scope of the present invention should not be limited thereto in any manner.

Examples 1 and 2: Manufacture of Electrically Conductive Metal Separation Membranes 1 g of stainless steel powder (Alfa Aesar, USA) having a mean particle size of about 44 μm was injected into a mold having a diameter of 20 cm. The powder was compacted under 312 MPa (Example 1) and 624 MPa (Example 2) for 1 minute to obtain compacted bodies, respectively. The compacted bodies obtained therefrom were sintered at 900° C. for 20 minutes under a reducing atmosphere with Ar. As a result, electrically conductive metal separation membranes were obtained.

Examples 3 and 4: Manufacture of Electrically Conductive Metal Oxide Separation Membranes The electrically conductive metal separation membranes manufactured from Examples 1 and 2 were sintered at 500° C. for 4 hours to oxidize the surface thereof. As a result, electrically conductive metal oxide separation membranes (Examples 3 and 4) were manufactured therefrom, respectively.

Experimental Example 1: Examination of Surface Features and Pore Sizes of Electrically Conductive Metal and Metal Oxide Separation Membranes The surface of the electrically conductive metal separation membrane obtained from Example 1 was analyzed by FE-SEM (S-4300, Hitachi, Japan), and the results thereof were shown in FIG. 1. Herein, the left photo represents compacted metal separation membrane and the right photo represents sintered metal separation membrane, both with a magnification of 500×. As shown in FIG. 1, it was confirmed that constant-sized pores were formed when high pressure was applied to the metal particles, and constant-sized pores was also observed even after sintering.

Experimental Example 2: Examination of Changes in Pore Sizes According to Applied Pressure, Sintering Duration, and Sintering Temperature The changes in pore sizes of the separation membranes manufactured were examined while varying applied pressure, sintering duration, and sintering temperature. The pore size of the separation membranes were measured by capillary flow porometer (CFP-1500AEL, PMI, USA), and changes in the mean pore size based on each condition were shown in FIGS. 2 to 4. As shown in FIGS. 2 to 4, the mean pore size decreased as the applied pressure and sintering temperature increased, and in contrast, the sintering duration did not greatly affect the pore size.

Example 5: Construction of Water Treatment System Using Electrically Conductive Separation Membranes As shown in FIG. 5, the water treatment system includes the electrically conductive separation membranes obtained from Examples 1 to 4 serving as an anode and a titanium plate coated with iridium oxide serving as a cathode. Herein, the distance between the electrodes was maintained at 1.3 mm, and treated waste water was arranged to flow only from electrically conductive metals. The system was operated in a cross flow manner. Further, the flow rate was 3.33 mL/min and the reaction volume was 229.73 mm$^3$.

Experimental Example 3: Examination of Membrane Permeability of Separation Membranes for Water Treatment of the Present Invention Permeability performance of the separation membranes was examined by the water treatment apparatus described in Example 5. The permeability performance of the separation membranes was examined based on ultra-pure permeability and waste water permeability.

The properties of waste water used in the examination of permeability performance of the separation membranes in Examples are shown in Table 1 below:

TABLE 1

| Items | Values |
|---|---|
| pH | 6.75 to 7.23 |
| Electrical Conductivity, μS/cm | 980 |
| Turbidity, NTU | 30.7 to 34.7 |
| Total Organic Carbon, mg/L | 6.45 to 8.43 |
| Dissolved Organic Carbon, mg/L | 5.18 to 5.40 |
| Total Chemical Oxygen Demand, mg/L | 61.6 to 67.5 |
| Dissolved Chemical Oxygen Demand, mg/L | 13.6 to 22.5 |

Further, electrical conductivity in water was measured by an electrical conductivity meter (cond 340i, WTW, Germany), pH was measured by a pH meter (pH 330i, WTW, Germany), and turbidity was measured by a turbidity meter (2100N, Hach, USA). Furthermore, the total organic carbon and dissolved organic carbon were analyzed by a total organic carbon analyzer (TOC-V CPH, Shimadzu, Japan), and the chemical oxygen demand was obtained by fractioning 2 mL of a given sample into the $COD_{cr}$ Analysis kit ($COD_{cr}$ LR, Hach, USA), followed by titration. The results obtained therefrom were shown in FIGS. 6 and 7.

When different ultra-pure permeabilities were compared as shown in FIG. 6, it was confirmed that the permeability rapidly increased as the separation membrane manufactured at low pressure (312 Mpa) underwent a sintering process, followed by an oxidation process at 500° C. for 4 hours. However, the separation membrane manufactured at high pressure (624 MPa) were found not to be affected by the oxidation process even after sintering. In the case in which waste water was used as inflowing water (FIG. 7), the permeability of the separation membranes significantly increased by more than three times when electricity was applied (4 V) compared to when no electricity was applied (0 V). This observation has resulted from the fact that organic matter capable of causing fouling of the separation membranes was oxidized at the surface thereof via electrolysis.

Experimental Example 4: Evaluation of Organic Matter Removal Capacity of the Separation Membranes for Water Treatment of the Present Invention The changes in the organic matter removal rate of the separation membranes were examined by the water treatment apparatus described in Example 5. Herein, the same waste water was used as in Example 3, the total organic carbon was analyzed by a total organic carbon analyzer (TOC-V CPH, Shimadzu, Japan), and the differences in the values before and after the water treatment were calculated to obtain the organic matter removal capacity.

The results were shown in FIG. 8.

As shown in FIG. 8, the organic matter removal rate that resulted from the filtering capacity of the separation membranes themselves was about 13.7%. In contrast, the removal rate that resulted from both the filtering capacity of the separation membranes and the electrochemical decomposition of organic matter with an applied voltage of 4 V increased to about 33.3%.

The invention claimed is:

1. A method for manufacturing a separation membrane for water treatment comprising:
    injecting an electrically conductive metallic or non-metallic particles having a particle size of 10 μm to 200 μm into a mold and applying pressure to obtain a compacted body (step 1);
    sintering the compacted body under an oxygen-free condition to manufacture a separation membrane for water treatment (step 2); and
    sintering the separation membrane for water treatment under an oxygen condition to oxidize the surface of the separation membrane for water treatment (step 3).

2. The method of claim 1, wherein the method further comprises:
    coating the separation membrane for water treatment with at least one catalyst selected from the group consisting of iridium oxide, titanium oxide, and niobium oxide (step 4) after step 2.

3. The method of claim 1, wherein the electrically conductive metallic or non-metallic particle is at least one species selected from the group consisting of stainless steel, titanium, aluminum, iron, and carbon nanotubes.

4. The method of claim 1, wherein the pressure range applied in step 1 is from 200 MPa to 800 MPa.

5. The method of claim 1, wherein the compacted body is a flat plate type.

6. The method of claim 1, wherein a gas used in the oxygen-free condition is at least one selected from the group consisting of argon, nitrogen, and hydrogen.

7. The method of claim 1, wherein the sintering temperature of step 2 is from 400° C. to 1400° C.

8. The method of claim 1, wherein the sintering temperature of step 3 is from 400° C. to 600° C.

9. The method of claim 1, wherein the method further comprises:
    coating the separation membrane for water treatment with at least one catalyst selected from the group consisting of iridium oxide, titanium oxide, and niobium oxide (step 4) after step 3.

10. A separation membrane comprising an oxidized layer on the surface of the separation membrane, obtained by sintering a compacted body of an electrically conductive metallic or non-metallic particles under an oxygen-free condition to manufacture the separation membrane and sintering the separation membrane under an oxygen condition to form the oxidized layer on the surface of the separation membrane, wherein the compacted body is formed by compaction of the electrically conductive metallic or non-metallic particles in a mold, and the electrically conductive metallic or non-metallic particle has a particle size of 10 μm to 200 μm.

11. The separation membrane of claim 10, wherein the pore size of the separation membrane is from 0.05 μm to 10 μm.

12. The separation membrane of claim 10, manufactured by the method of claim 1.

13. The separation membrane of claim 10, further comprising:
a coating layer on the surface of the separation membrane, wherein the coating layer is formed by at least one catalyst selected from the group consisting of iridium oxide, titanium oxide, and niobium oxide.

14. A water treatment method comprising:
bringing a separation membrane for water treatment, comprising an oxidized layer on the surface thereof, in contact with water targeted for water treatment (step a); and
filtering water while applying electricity to the separation membrane for water treatment having contact with water (step b),
wherein the separation membrane comprising the oxidized layer on the surface of the separation membrane is obtained by sintering a compacted body of an electrically conductive metallic or non-metallic particles under an oxygen-free condition to manufacture the separation membrane and sintering the separation membrane under an oxygen condition to form the oxidized layer on the surface of the separation membrane, wherein the compacted body is formed by compaction of the electrically conductive metallic or non-metallic particles in a mold, and the electrically conductive metallic or non-metallic particle has a particle size of 10 µm to 200 µm.

15. The water treatment method of claim 14, wherein the separation membrane for water treatment is used as an anode.

16. The water treatment method of claim 14, wherein the separation membrane is manufactured by the method of claim 1.

17. The water treatment method of claim 14, wherein the separation membrane further comprises:
a coating layer on the surface of the separation membrane, wherein the coating layer is formed by at least one catalyst selected from the group consisting of iridium oxide, titanium oxide, and niobium oxide.

18. A method for manufacturing a separation membrane for water treatment comprising:
injecting an electrically conductive metallic or non-metallic particle having a particle size of 10 µm to 200 µm into a mold and applying pressure to obtain a compacted body (step 1);
sintering the compacted body under an oxygen-free condition to manufacture a separation membrane for water treatment (step 2); and
coating the separation membrane for water treatment with at least one catalyst selected from the group consisting of iridium oxide, titanium oxide, and niobium oxide (step 4).

19. A water treatment method comprising:
bringing a separation membrane for water treatment, comprising a coating layer on the surface thereof, in contact with water targeted for water treatment (step a); and
filtering water while applying electricity to the separation membrane for water treatment having contact with water (step b),
wherein the separation membrane is obtained by sintering a compacted body of an electrically conductive metallic or non-metallic particle under an oxygen-free condition, wherein the compacted body is formed by compaction of the electrically conductive metallic or non-metallic particle in a mold, and the electrically conductive metallic or non-metallic particle has a particle size of 10 µm to 200 µm, and
wherein the coating layer is formed by at least one catalyst selected from the group consisting of iridium oxide, titanium oxide, and niobium oxide.

* * * * *